(12) United States Patent
Chalfin

(10) Patent No.: US 11,016,512 B2
(45) Date of Patent: *May 25, 2021

(54) EXTERNALLY ADJUSTABLE FLOW MANAGEMENT VALVE ASSEMBLY AND SYSTEM

(71) Applicant: Flow Dynamics, LLC, Encinitas, CA (US)

(72) Inventor: Jeffrey Alan Chalfin, Carlsbad, CA (US)

(73) Assignee: Flow Dynamics, LLC, Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,855

(22) Filed: May 8, 2018

(65) Prior Publication Data

US 2018/0329435 A1    Nov. 15, 2018

Related U.S. Application Data

(63) Continuation-in-part of application No. 15/496,212, filed on Apr. 25, 2017.

(51) Int. Cl.
| F16K 17/06 | (2006.01) |
| F16K 3/14 | (2006.01) |
| G05D 7/01 | (2006.01) |
| G01F 15/00 | (2006.01) |
| F16K 21/06 | (2006.01) |
| G01F 1/74 | (2006.01) |
| F16K 15/06 | (2006.01) |
| F16K 15/18 | (2006.01) |
| G01F 15/08 | (2006.01) |
| F16K 24/02 | (2006.01) |
| F16K 1/42 | (2006.01) |

(52) U.S. Cl.
CPC ............ G05D 7/0133 (2013.01); F16K 1/42 (2013.01); F16K 3/14 (2013.01); F16K 15/063 (2013.01); F16K 15/18 (2013.01); F16K 21/06 (2013.01); F16K 24/02 (2013.01); G01F 1/74 (2013.01); G01F 15/005 (2013.01); G01F 15/08 (2013.01)

(58) Field of Classification Search
CPC ........... F16K 3/14; F16K 17/06; F16K 17/065
USPC .......... 137/524, 530, 540, 542, 543; 251/42
See application file for complete search history.

(56) References Cited

U.S. PATENT DOCUMENTS

| 678,565 A | 7/1901 | Herbst |
| 967,514 A | 8/1910 | Groh |
| 1,785,271 A | 12/1930 | Lemex |
| 2,301,276 A | 11/1942 | Gussick |
| 2,594,641 A | 4/1952 | Griffith et al. |
| 2,870,784 A | 1/1959 | Walter |

(Continued)

*Primary Examiner* — Paul J Gray
(74) *Attorney, Agent, or Firm* — GrayRobinson, P.A.; Michael J. Colitz, III

(57) ABSTRACT

Disclosed is a system and valve assembly that can be used to promote the laminar flow of a variety of fluids and gases. In one embodiment, the valve assembly can be used to remove entrained water bubbles from a water supply. This, in turn, increases the density of water running through an associated water meter. This ensures that the water meter is not inaccurately including entrained air as metered water. The result is more accurate water readings and reduced utility bills. The assembly can be externally adjusted using an adjustment tool so as to increase or decrease the tension on an interior spring which, in turn, increases or decreases the rate at which the interior block oscillates.

9 Claims, 11 Drawing Sheets

(56) References Cited

U.S. PATENT DOCUMENTS

| | | | |
|---|---|---|---|
| 3,255,774 | A | 6/1966 | Gallagher et al. |
| 3,405,927 | A | 10/1968 | Josef et al. |
| 3,422,840 | A | 1/1969 | Bryant et al. |
| 3,434,495 | A | 3/1969 | Scaramucci |
| 3,747,629 | A | 7/1973 | Bauman |
| 3,938,542 | A | 2/1976 | Bolha |
| 4,466,461 | A | 8/1984 | Weiss |
| 4,535,808 | A | 8/1985 | Johanson et al. |
| 4,757,974 | A | 7/1988 | Ward et al. |
| 5,349,984 | A | 9/1994 | Weinheimer et al. |
| 5,379,835 | A | 1/1995 | Streich |
| 6,866,062 | B2 | 3/2005 | Lammers |
| 8,707,981 | B2 | 4/2014 | Edgeworth |
| 8,944,098 | B1 | 2/2015 | Bocos et al. |
| 9,404,244 | B1 | 8/2016 | Gass et al. |
| 2004/0045607 | A1 | 3/2004 | Lammers |
| 2004/0079418 | A1 | 4/2004 | Weis et al. |
| 2007/0039652 | A1 | 2/2007 | Staggs |
| 2007/0044848 | A1 | 3/2007 | Norman |
| 2009/0007973 | A1 | 1/2009 | Benvenuto |
| 2009/0289207 | A1 | 11/2009 | Barreda et al. |
| 2012/0118406 | A1 | 5/2012 | Edgeworth |
| 2014/0182717 | A1 | 7/2014 | Edgeworth |

EXTERNALLY ADJUSTABLE FLOW MANAGEMENT VALVE ASSEMBLY AND SYSTEM

CROSS REFERENCE TO RELATED APPLICATIONS

This application is a continuation-in-part of, and claims priority to, co-pending application Ser. No. 15/496,212 filed on Apr. 25, 2017 and entitled, "Externally Adjustable Flow Management Valve Assembly and System," the contents of this co-pending application are incorporated herein for all purposes.

BACKGROUND OF THE INVENTION

Field of the Invention

This invention relates to a valve. More specifically, the present invention relates to a valve that promotes the laminar flow of a gas or fluid traveling through the valve.

Description of the Background Art

The use of valve assemblies are known in the art. For example, U.S. Pat. App. 2009/0289207 to Barreda discloses a valve assembly that is adapted to be disposed within a water supply line. The valve assembly is structured to reduce, or significantly eliminate, the passage of air through the meter. The valve body includes a sealing structure which is biased under a predetermined force into sealing relation with an inlet of the channel. The predetermined force is sufficient to prevent displacement of the sealing structure, but insufficient to prevent displacement of the sealing structure in response to normal water flow. As a result, any air flow within the water supply line will be compressed or otherwise disbursed and prevented from passing through the meter, thereby preventing unnecessary charges being made to the metered facility.

Although the device of Barreda is sufficient to achieve its stated objective, it is lacking in many respects. The valve assembly of Barreda is needlessly complex with an excess number of moving parts. Moreover, the number of interconnected moving parts requires the device to be lubricated. This lubrication can result in the contamination of the associated water. The system of Barreda is also a problematic solution insomuch as its valve assembly must be installed upstream of the meter assembly. Retrofitting a valve assembly upstream of a water meter poses several logical, legal, and safety related issues. The system of the present invention is aimed at overcoming these and other shortcomings of the Barreda device.

SUMMARY OF THE INVENTION

It is therefore an object of the present invention to provide a system for increasing the density of water running through a meter to thereby increase the accuracy of the meter.

It is another object of the present invention to compress the air out of the water as it is being metered.

A further object of the present invention is to provide a valve assembly for increasing the efficiency of an upstream water meter.

Still yet another object of the present invention is to provide a valve assembly that is constructed from self-lubricating polymers to thereby reduce wear and avoid the need for external lubricants.

Yet another object of the present invention is to provide a valve construction that eliminates turbulence within a fluid or gas passing there through.

A further object of the present invention is to provide an improved valve construction with a minimal number of moving parts to thereby increase the life cycle of the valve and eliminate the need for repair and maintenance.

Another object of the present invention is to provide an improved valve construction that can be adjusted externally.

Another object of the present invention is to provide an adjustment tool which does not require individual calibration prior to installation.

Another object of the present invention is to provide the ability to fine-tune a valve for optimal performance after its installation.

Another object of the present invention is to provide the ability to adjust to future changes in system pressure or flow.

Another object of the present invention is to provide the ability to make adjustments without the need to hire a professional or turn off the water flow, or remove the device from the system.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

| PARTS LIST | |
|---|---|
| 10 | Assembly |
| 12 | Valve Housing |
| 14 | Upper Valve Housing |
| 16 | Lower Valve Housing |
| 17 | Window |
| 18 | Forward Valve Inlet |
| 20 | Rearward Valve Outlet |
| 22 | Tapered Valve Seat |
| 24 | Valve Disc |
| 26 | Spring |
| 28 | Valve Shaft |
| 30 | Shoulder |
| 32 | Retainer |
| 34 | Outer Housing |
| 36 | Threading |
| 38 | Outside Face |
| 40 | Adjustment Tool |
| 42 | Adjustment Bore |
| 44 | Grip |
| 46 | Proximal End |
| 48 | Distal End |
| 50 | Curved Prong |
| 52 | Extension |
| 54 | Housing Valve Inlet |
| 56 | Housing Valve Outlet |
| 58 | Male-Threaded Head |
| 60 | Female-Threaded Head |
| 70 | Flow Meter |

DETAILED DESCRIPTION OF THE PREFERRED EMBODIMENT

This disclosure relates to an externally adjustable flow management valve assembly. In one embodiment, entrained water bubbles can be removed from a water supply. This, in turn, increases the density of the water running through the water meter. This ensures that the water meter is not inaccurately including entrained air as metered water. The result is more accurate water readings and reduced utility bills. The assembly can likewise be used to promote the laminar flow of other fluids or gases. The various components of the present invention and the manner in which they interrelate will be described in greater detail hereinafter.

Figure 1:
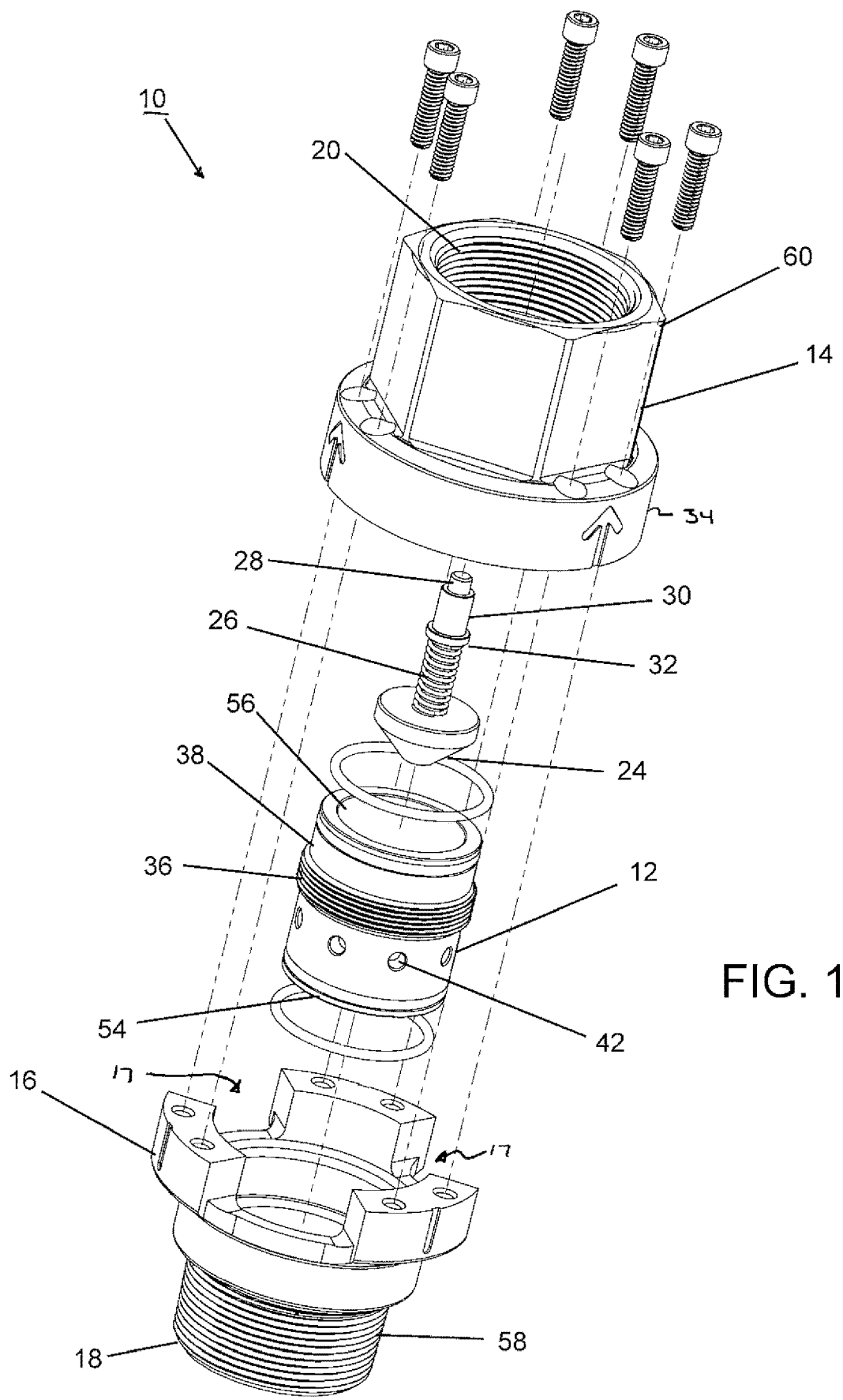
FIG. 1 is an exploded view of a valve assembly of the present invention.

With reference to FIG. 1, the assembly 10 is shown, including a spring biased plunger 24 that is triggered at a predetermined fluid pressure. With device 10 positioned adjacent a water meter, this has the effect of driving out any entrained air and thereby increasing the water density as it runs through a water meter. This, in turn, increases the efficiency of the water meter and ensures that the consumer is paying only for the water they use as opposed to water and entrained air. Water meters measure volume; water with air has more volume than water without air given that air has volume. When presented with pressure, the water displaces the air and increases the water density.

As seen in FIGS. 1-4, the assembly 10 comprises a cylindrical valve housing 12 which is nested within an outer housing 34. Out housing 34 includes an upper housing 14 positioned over the outlet side of housing 12 and a lower housing 16 that is positioned over the inlet side of the housing 12. The lower housing 16 has a forward valve inlet 18 and the upper housing 14 has a rearward valve outlet 20. Lower housing includes a series of cut-outs or windows 17 about its periphery. Valve housing 12 has a housing valve inlet 54 and housing valve outlet 56. The valve housing 12 is preferably constructed from a self-lubricating polymer such as Acetron GP, Vesconite™, or Delrin™. The valve housing 12 further includes a tapered valve seat 22 (FIG. 7) that is positioned adjacent to forward valve inlet 18. The valve housing 12 has male threads 36 on its outer surface face 38. These threads 36 mate with threads on inner surface of outer housing 34, whereby valve housing 12 can rotate and move with respect to outer housing 34. The valve housing 12 further comprises a series of adjustment bores 42 which, as described below, can be used to rotate the valve housing 12 within outer housing 34.

Figure 2:
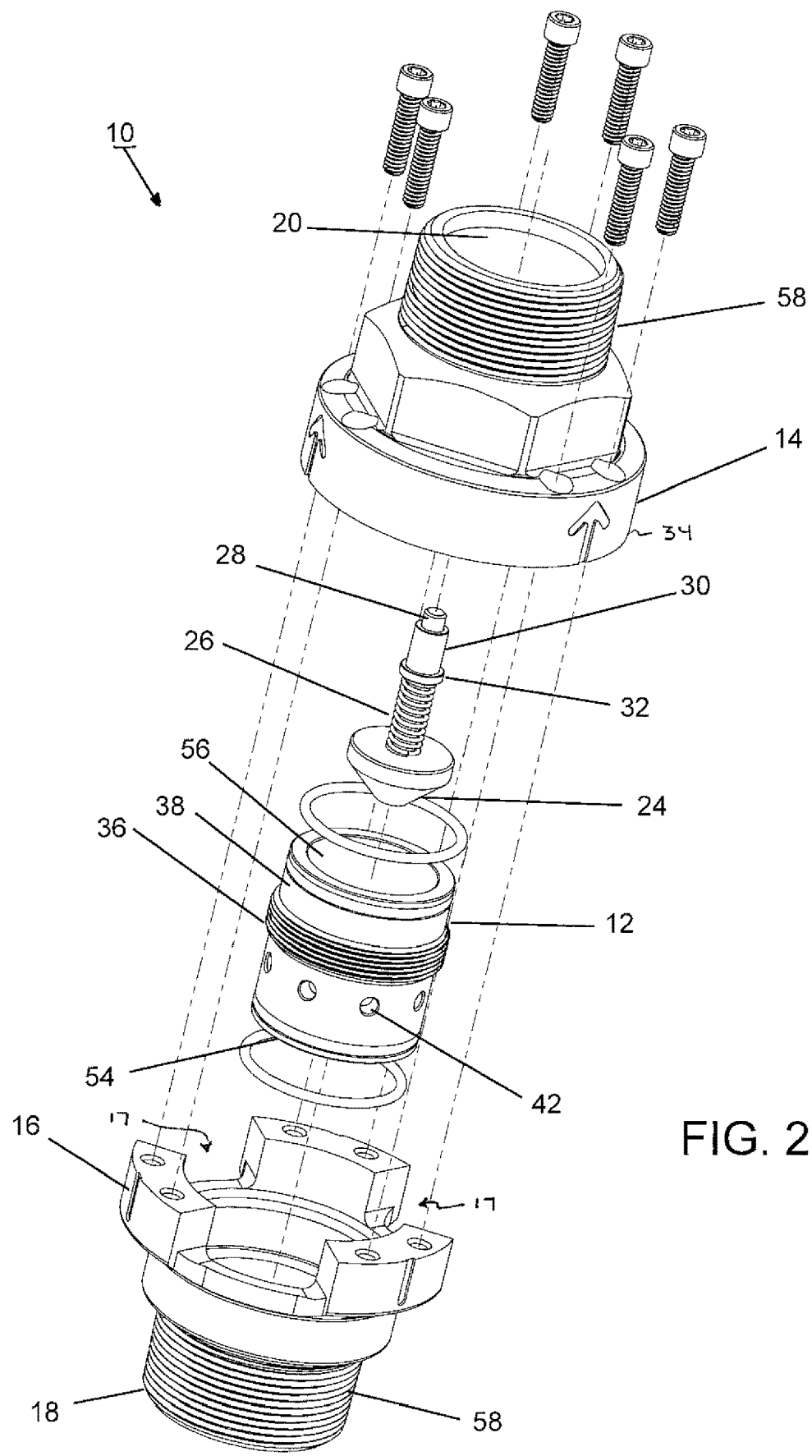
FIG. 2 is an exploded view of a valve assembly of the present invention with an alternative proximal shoulder construction.
Figure 3:
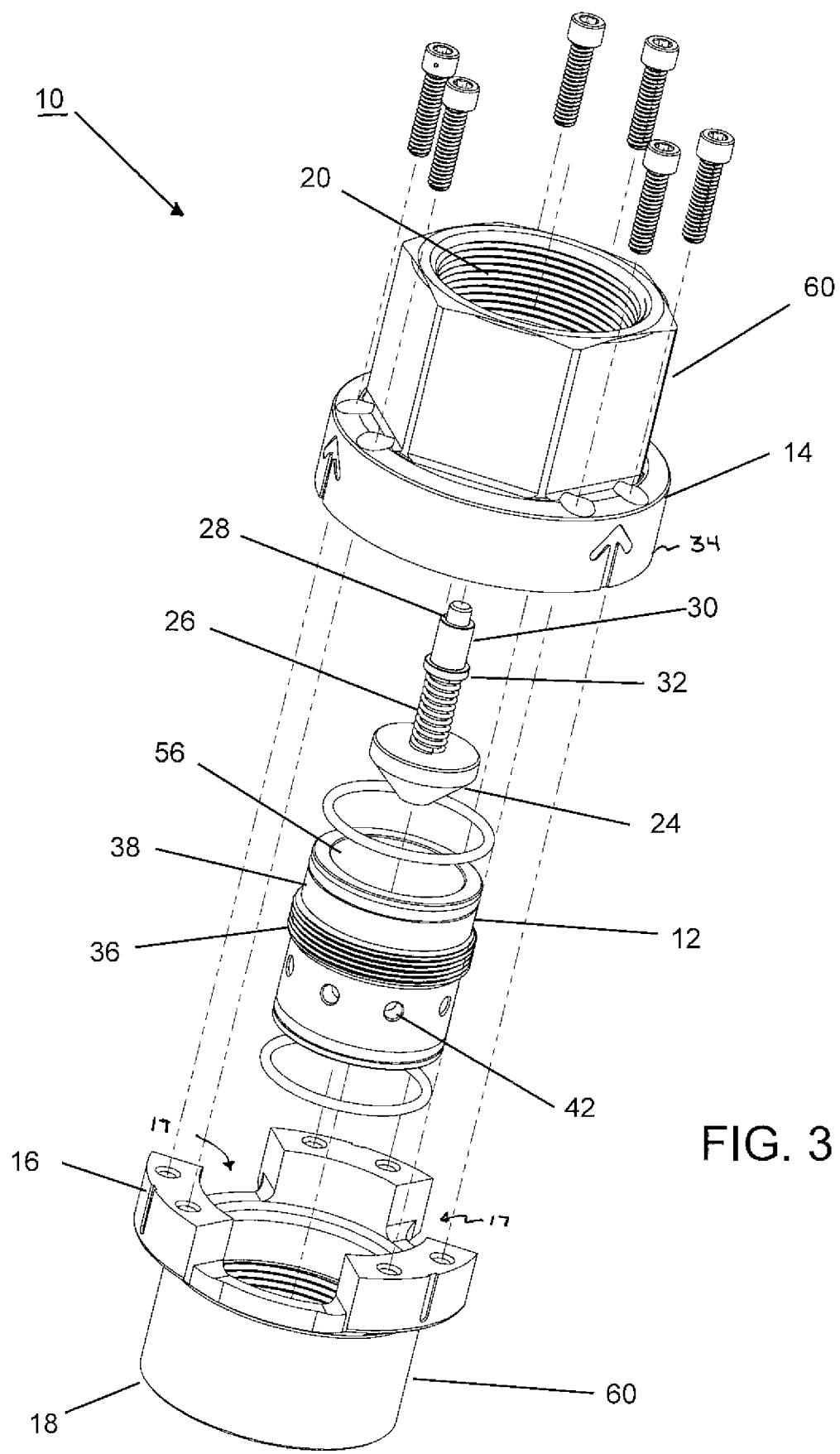
FIG. 3 is an exploded view of a valve assembly of the present invention with an alternative distal shoulder construction.
Figure 4:
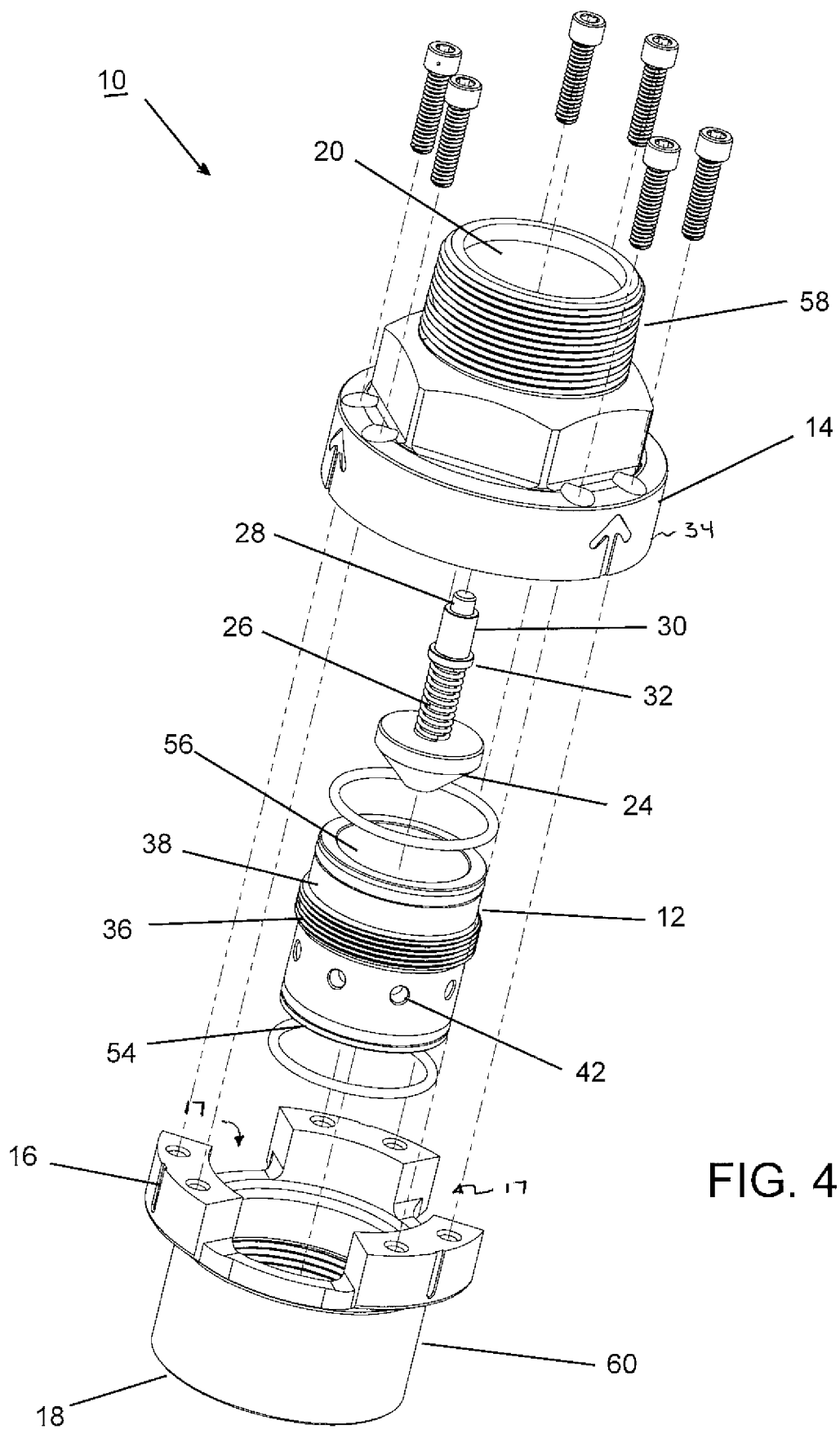
FIG. 4 is an exploded view of a valve assembly of the present invention with alternative proximal and distal shoulder constructions.
Figure 9:
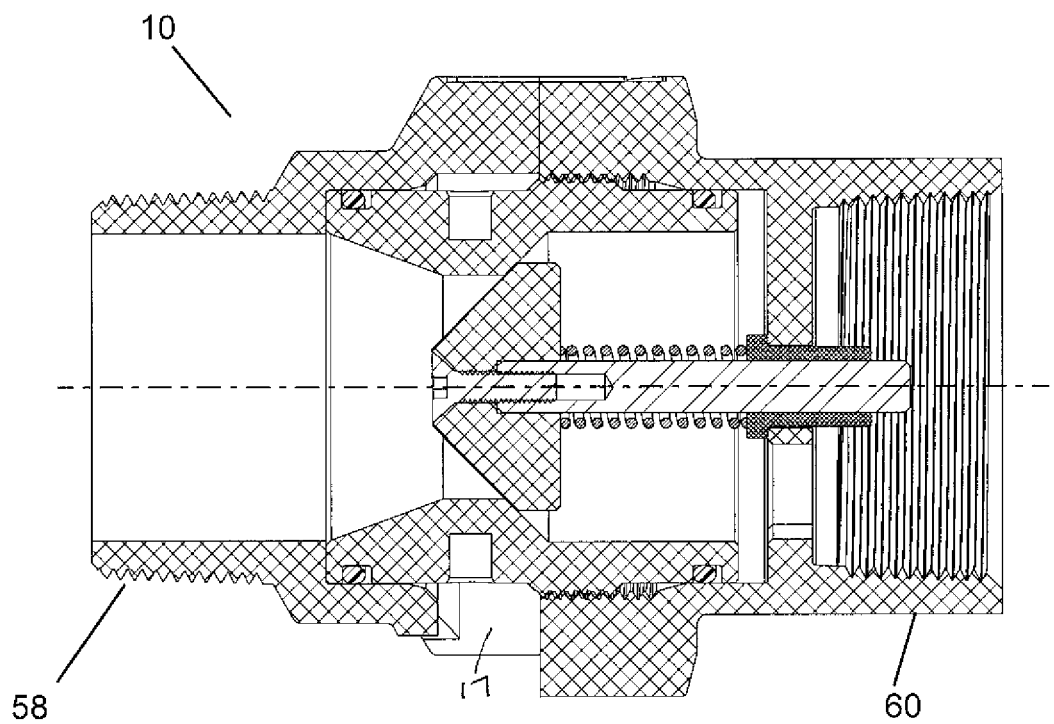
FIG. 9 is a cross-sectional view of the valve assembly wherein the proximal shoulder has a female threaded connection head and the distal shoulder has a male threaded connection head.
Figure 10:
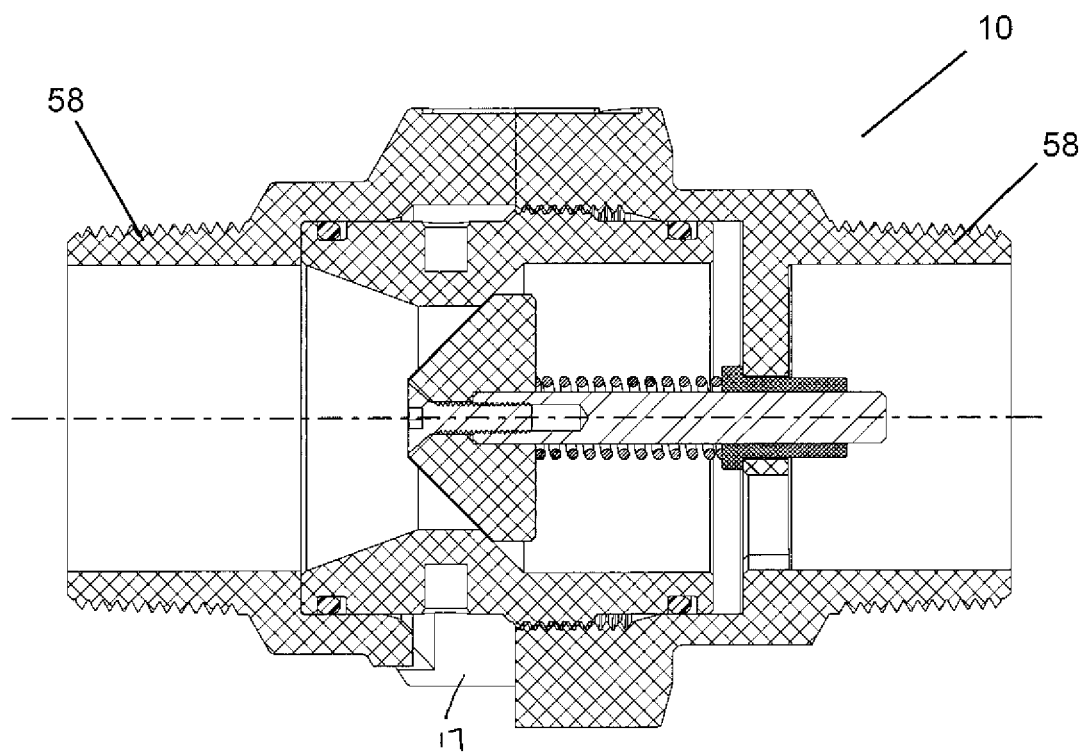
FIG. 10 is a cross-sectional view of the valve assembly wherein the proximal shoulder and the distal shoulder have male threaded connection head.
Figure 11:
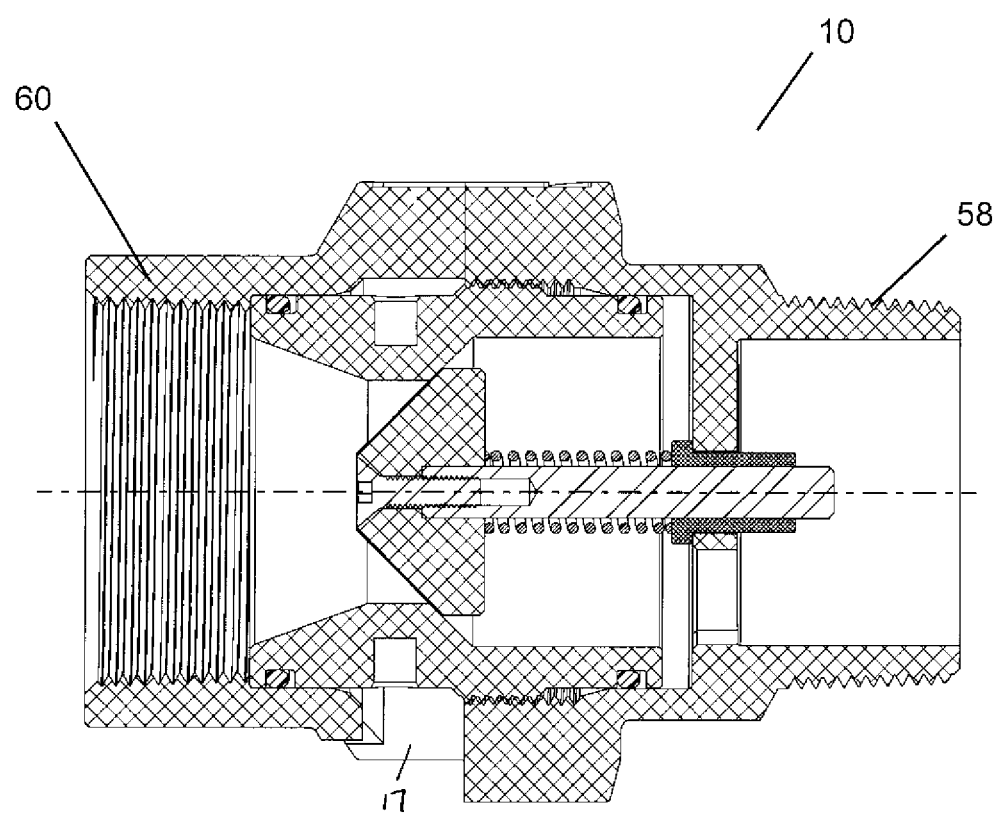
FIG. 11 is a cross-sectional view of the valve assembly wherein the proximal shoulder has a male threaded connection head and the distal shoulder has a female threaded connection head.

Upper housing 14 and lower housing 16 may be any type of threaded head. For example, FIG. 1 depicts a female-threaded head 60 for the upper housing 17 and a male-threaded head 58 for the lower housing 16. FIG. 2 depicts both ends having male threads. FIG. 3 depicts both ends having female threads. FIG. 4 depicts lower housing 16 having female threads and upper housing 14 having male threads. FIGS. 9-11 depict cross-sectional views of the assembly 10 with male-female, male-male, and female-male connections. Other connection types are also possible, such as flanged or friction fit connections. These varying connection types can be of any variety so long as it allows the outer housing 34 to be attached to a water meter and water line. Alternatively, housing 34 can be connected to a gas or other fluid line.

The assembly 10 can be opened and closed by way of a valve disc 24. Again, this valve disc 24 is preferably formed from a self-lubricating polymer which may be the same polymer used for the cylindrical valve housing 12. The valve disc 24 includes a tapered extent and is generally in the shape of a frustro cone. As illustrated in FIG. 2, the taper of the valve seat 22 approximately matches the taper of the valve disc 24 so that the two can be placed in a fluid tight seal. The use of self-lubricating polymers eliminates the need for any gasket or sealing rings. As such, the valve disc 24 includes a seated orientation where it is in positive and sealing contact with the valve seat 22 to prevent fluid flow. The valve disc 24 also includes an unseated orientation wherein it is spaced a distance from the valve seat 22. The unseated orientation requires the bias of spring 26 to be overcome.

With continuing reference to FIGS. 1-4, the valve shaft 28 is depicted. The valve shaft 28 is generally defined with a forward end, a rearward end, and an intermediate extent therebetween. The valve disc 24 includes a centrally located threaded passage into which an end of shaft 28 is secured. The spring 26 is positioned along the intermediate extent of the valve shaft 28. The spring has a first end which is in contact with a shoulder 30 of the retainer 32 positioned on the rearward end of the valve shaft 28 and a second end which is in contact with the valve disc 24. As such, the spring 26 acts to bias the valve disc 24 into a seated orientation. However, the tension of the spring 26, and thus the force needed to unseat disc 24, can be changed by the user by rotating the valve housing 12 within housing 34 in a manner described in further detail below.

With this arrangement, water or fluid contacting the valve disc 24 will be prevented from flowing through the valve housing 12 unless it exceeds a predetermined threshold pressure as dictated by the spring tension. Once the threshold pressure is achieved, spring force will be overcome and the valve disc 24 will unseat. This will allow the water, fluid, or gas to pass through the valve housing 12. It is envisioned that the fluid will repetitively cross this threshold pressure. This will cause the valve disc 24 to repetitively open and close. This, in turn, results in the fluid upstream of valve 12 becoming more dense and driving out any entrained air. It also results in the downstream flow becoming more stable and laminar.

Figure 5:
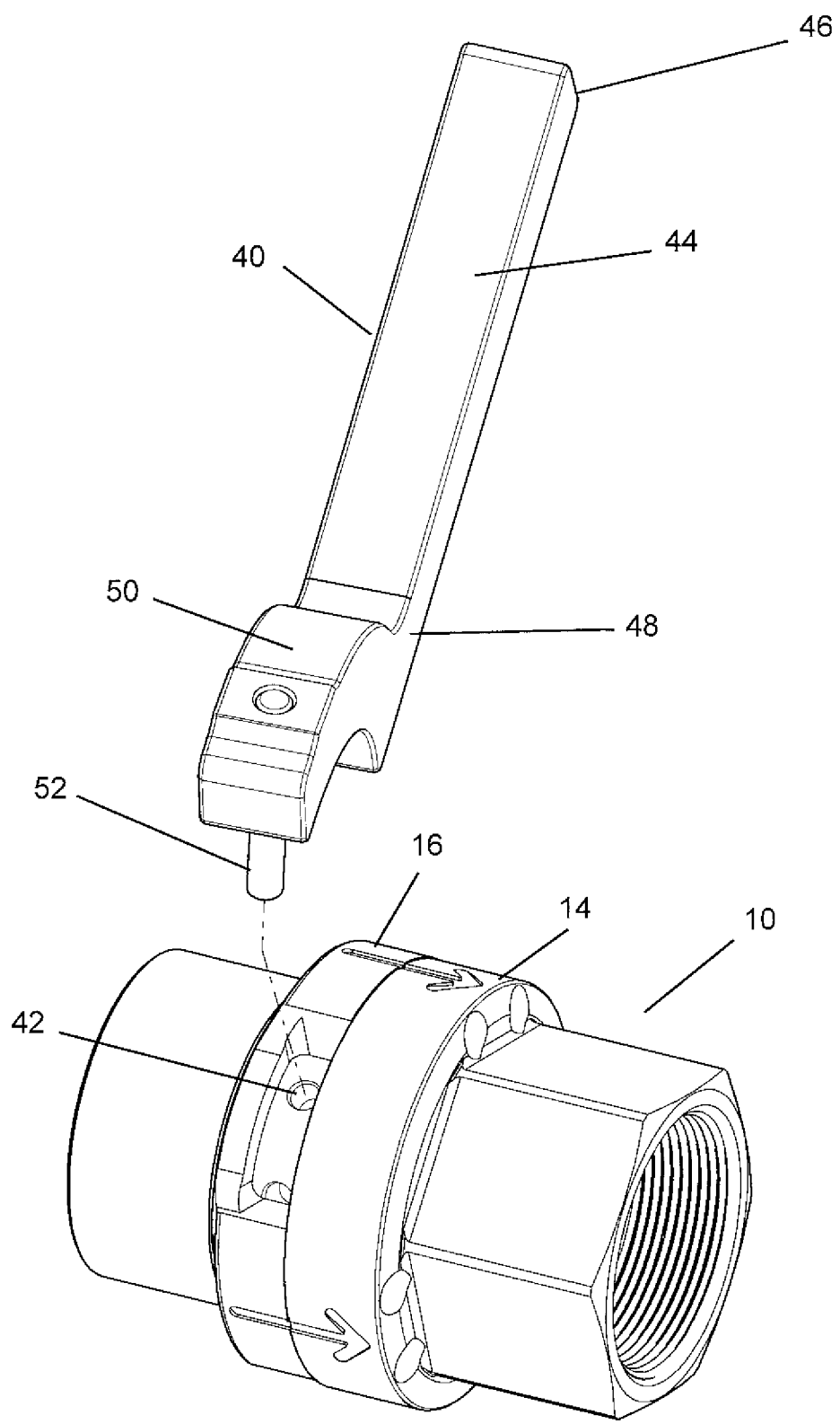
FIG. 5 is a perspective view of the valve assembly and adjustment tool.
Figure 6:
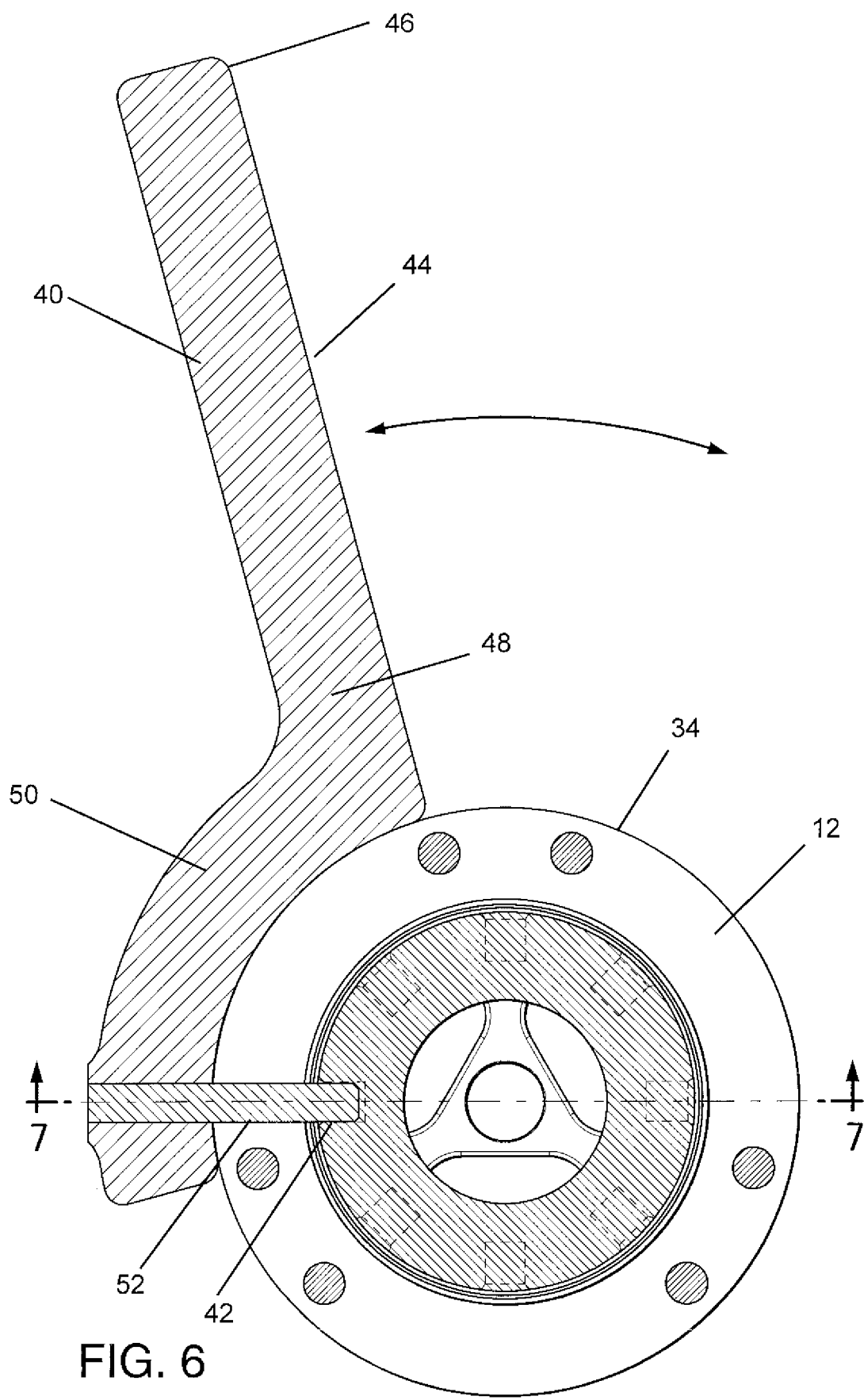
FIG. 6 is a cross-sectional view of the adjustment tool engaged with the valve assembly.
Figure 7:
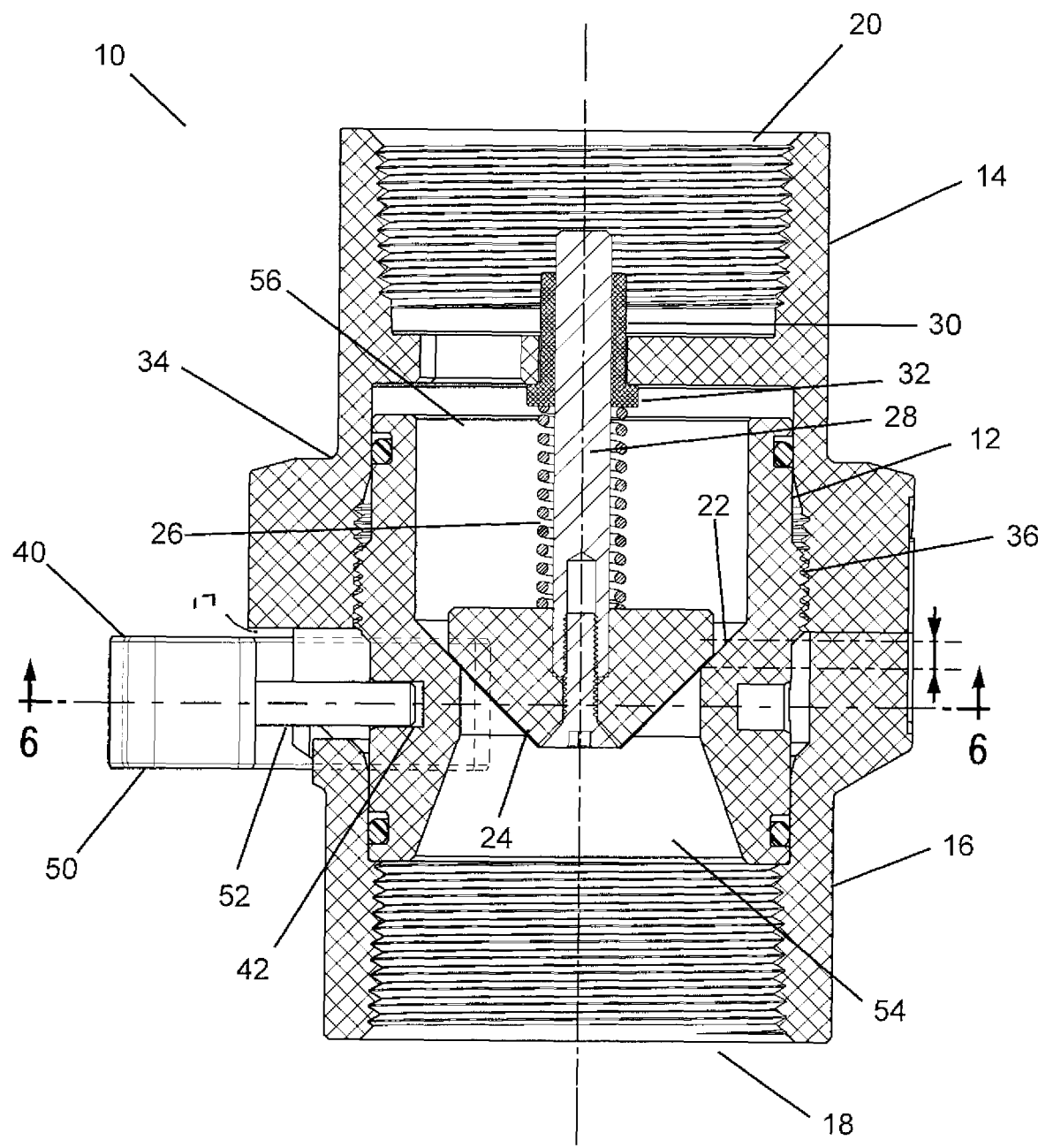
FIG. 7 is a cross-sectional view of the valve assembly while engaged with the adjustment tool.
Figure 8:
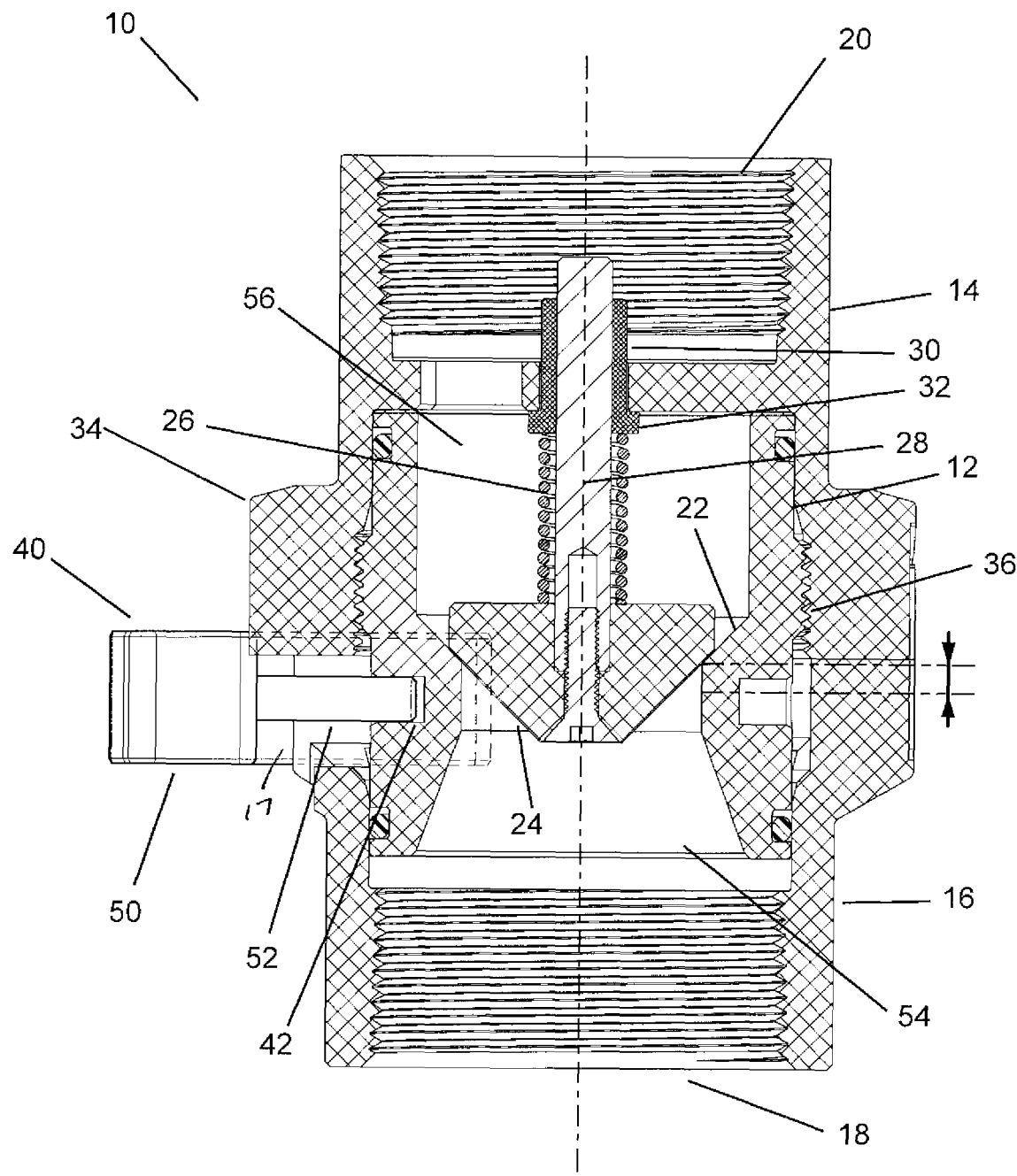
FIG. 8 is a cross-sectional view of the valve assembly and adjustment tool after the adjustment tool has been rotated around the central axis.

FIG. 5 is a perspective view of the assembly 10 and the associated adjustment tool 40. Adjustment tool 40 comprises a grip 44 having a proximal end 46 and distal end 48. Distal end 48 terminates with a curved prong 50 having an extension 52. Extension 52 is preferably cylindrical but may be rectangular or any other prismed shape which corresponds with the shape and size of adjustment bores 42. As seen in FIG. 6, the extension 52 can be inserted into an adjustment bore 42 (via a window 17 in lower valve housing 16). Further, as shown in FIGS. 7 and 8, once the adjustment tool 40 engages the adjustment bore, the valve housing 12 can be rotated with respect to outer housing 34. Rotating housing 12 in this manner causes housing 12 shift its linear position within housing 34. This, in turn, changes the distance between valve seat 22 and valve housing 14. As illustrated in FIGS. 7-8, this changes the tension spring 26 and thus the force needed to unseat disc 24.

Although the devices detailed above have been disclosed for use in driving air out of water, device 10 can likewise be used in connection with a wide variety of other fluids. As used herein, "fluid" includes both liquids as well as gases. By way of non-limiting example, device 10 can be used with a variety of liquid lubricants, such as synthetic or natural oils, as well as liquid coolants such antifreeze or refrigerants such as R-22. Regardless of the fluid traveling through device 10, the device can be used to effectively drive out unwanted materials. These unwanted materials can be air, water, or various contaminates. In this regard, device 10 can be used with any of a variety of gases, such as natural gas, carbon dioxide, hydrogen chloride, or nitrous oxide. Again, device 10 can be used to drive other gases or fluids from the primary gas traveling through device 10. Device 10 can likewise be used with variety of vapors or condensates. Those of ordinary skill in the art will appreciate still yet other common fluids, gases, or condensates that can be used in connection with device 10.

Figure 12:
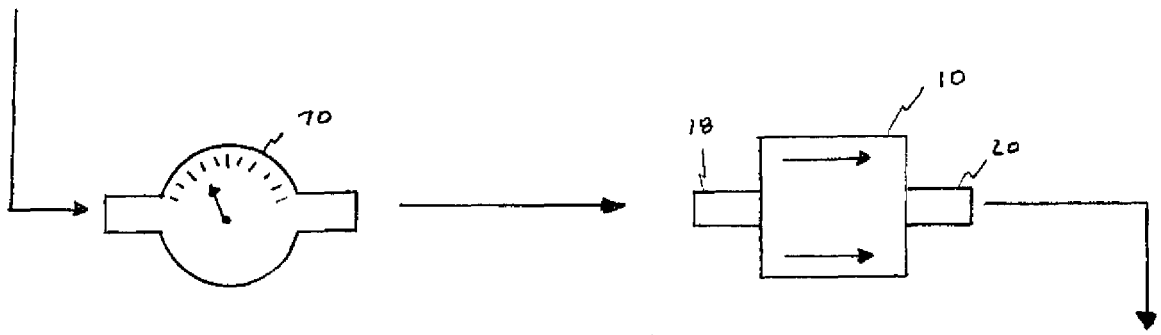
FIG. 12 is a diagram showing the valve assembly positioned downstream from a flow meter.
Figure 13:
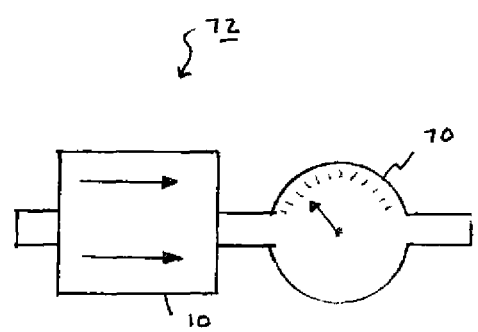
FIG. 13 is a view of a combined valve and flow meter.
Figure 14:
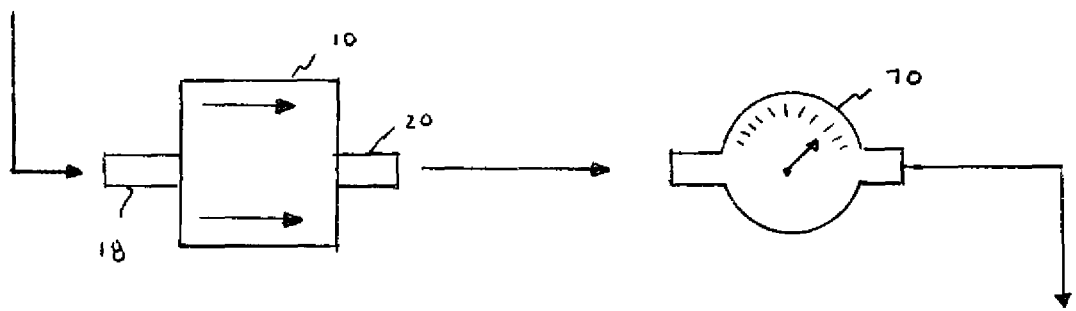
FIG. 14 is a diagram showing the flow meter positioned downstream of the valve assembly.

FIGS. 12-14 disclose various systems in which the device 10 can be utilized. In particular, FIG. 12 illustrates a system wherein device 10 is positioned downstream of an associated water meter 70. This allows water meter 70 to accept an incoming flow from, for example, a municipal water source. Water meter 70 would monitor and keep track of the volume of water flowing through meter 70. Water exiting meter 70 would then be passed to the valve inlet 18 of valve assembly 10. Thereafter, water leaving the valve outlet 20 would be distributed to the occupants of the associated building. The benefit of this system is that device 10 would, as described hereinabove, remove any entrained air from the flow of water. This would have the benefit of removing the entrained air at a location upstream of device 10 thereby increasing the efficiency and accuracy of water meter 70.

FIG. 14 discloses still yet another system in which the position of the valve assembly 10 and water meter 70 are reversed. In this embodiment, device 10 is placed upstream of water meter 70. In other words, water meter 70 is placed downstream of device 10. This arrangement would still achieve many of the benefits described in conjunction with the system of FIG. 12, but would add yet another desired effect. Often times the flow of water through meter 70 is insufficient for measurement. For example, if the building being monitored has a slow leak, this volumetric flowrate may be too small to be monitored or measured. In such instances, hundreds or thousands of gallons of water can be slowly consumed over time without any corresponding measurement by meter 70. To avoid this, device 10 can be placed upstream of water meter 70. The valve disc 24 and spring 26 would be arranged such that only water flowing at a pre-designated flow rate would be delivered to water meter 70. This pre-designated flow rate can be chosen to ensure that it is sufficient to trigger water meter 70 and thereby be measured. Finally, FIG. 13 shows still yet another embodiment of the present invention wherein device 10 is physically coupled to an associated flow meter 70. This combined device ensures that fluid is delivered to meter 70 only at a designated and measurable volume.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:
1. A valve assembly having an inlet and an outlet, the valve assembly adapted to increase the accuracy of an upstream meter, the valve assembly comprising:
   a cylindrical valve housing nested within an upper housing and lower housing, the valve housing having a housing valve inlet and a housing valve outlet, a tapered valve seat positioned adjacent to the housing valve inlet, a plurality of adjustment bores, and a series of housing threads on an outside face of the valve housing;
   a valve disc positioned within the valve housing, the disc being tapered along its length, wherein the taper of the valve seat matches the taper of the valve disc, the valve disc having a seated orientation wherein it is in contact with the valve seat and an unseated orientation wherein the valve disc is spaced from the valve seat;
   a valve shaft having a forward end, a rearward end, and an intermediate extent therebetween, the valve shaft further comprising a retainer having a shoulder on the rearward end extending perpendicularly from a surface of the retainer and having an axial passage, the valve shaft slidably positioned within the axial passage;
   a coil spring positioned about the intermediate extent of the valve shaft, the coil spring having a first end in contact with the shoulder of the retainer, a second end of the coil spring contacting the valve disc, whereby the spring tension is varied depending upon the position of the housing threads which may be raised or lowered using an adjustment tool, the adjustment tool comprising a grip having a proximal and a distal end wherein the distal end terminates in a curved prong having an extension which protrudes from the curved prong.

2. The valve assembly of claim 1 wherein the valve assembly is used in connection with a water meter.

3. The valve assembly of claim 1 wherein the valve assembly is used in connection with a fluid meter.

4. The valve assembly of claim 1 wherein the valve assembly is used in connection with a condensate meter.

5. The valve assembly of claim 1 wherein the valve assembly is used in connection with a gas meter.

6. The valve assembly of claim 1 wherein the extension of the adjustment tool comprises a prism shape.

7. An externally adjustable valve assembly comprising:
  a valve housing including an outer housing with external threads, first and second sides, a valve seat, a series of adjustment holes formed within the outer housing, a valve disc positioned within the valve housing and positioned for selective engagement with the valve seat, a spring operatively connected to the valve disc and biasing the valve disc to a closed position against the valve seat;
  a first enclosure positioned over the first side of the valve housing, the first enclosure including internal threads, the internal threads of the first enclosure mating with the external threads of the valve housing;
  a second enclosure positioned over the second side of the valve housing and coupled to the first enclosure, the second enclosure including a plurality of windows around a periphery of the second enclosure, the adjustment holes being accessible through the plurality of windows;
  whereby the adjustment holes can be used to rotate and move the valve housing relative to the first and second enclosures with the movement of the valve housing selectively adjusting the tension of the spring.

8. The externally adjustable valve assembly as described in claim 7 wherein the second enclosure includes internal threads that mate with the external threads of the valve housing.

9. The externally adjustable valve assembly as described in claim 7 wherein the plurality of windows are formed in the first enclosure.

\* \* \* \* \*